United States Patent
Thakkar et al.

(10) Patent No.: US 11,582,090 B2
(45) Date of Patent: Feb. 14, 2023

(54) SERVICE CHAINING OF VIRTUAL NETWORK FUNCTIONS IN A CLOUD COMPUTING SYSTEM

(71) Applicant: VMware, Inc., Palo Alto, CA (US)

(72) Inventors: Sachin Thakkar, San Jose, CA (US);
Allwyn Sequeira, Saratoga, CA (US);
Serge Maskalik, Los Gatos, CA (US);
Debashis Basak, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/105,264

(22) Filed: Aug. 20, 2018

(65) Prior Publication Data
US 2020/0059403 A1    Feb. 20, 2020

(51) Int. Cl.
| H04L 41/0806 | (2022.01) |
| H04L 67/1097 | (2022.01) |
| H04L 69/324 | (2022.01) |
| H04L 69/325 | (2022.01) |
| H04L 41/40 | (2022.01) |
| H04L 41/5054 | (2022.01) |
| H04L 67/10 | (2022.01) |

(52) U.S. Cl.
CPC ...... *H04L 41/0806* (2013.01); *H04L 67/1097* (2013.01); *H04L 69/324* (2013.01); *H04L 69/325* (2013.01)

(58) Field of Classification Search
CPC ............. H04L 41/0806; H04L 67/1097; H04L 69/325; H04L 69/324
See application file for complete search history.

(56) References Cited

U.S. PATENT DOCUMENTS

| | | | |
|---|---|---|---|
| 2013/0303188 A1* | 11/2013 | Butala | H04W 4/025 455/456.2 |
| 2016/0191345 A1* | 6/2016 | Despotovic | H04L 41/5054 709/226 |
| 2017/0277554 A1* | 9/2017 | Oehrlein | H04L 41/0896 |
| 2018/0018195 A1* | 1/2018 | Kim | H04L 41/0895 |
| 2018/0191581 A1* | 7/2018 | Yu | H04L 41/042 |
| 2019/0028502 A1* | 1/2019 | Bihannic | H04L 63/1425 |
| 2019/0394132 A1* | 12/2019 | Zhang | H04L 45/125 |

* cited by examiner

*Primary Examiner* — Harry H Kim
(74) *Attorney, Agent, or Firm* — Patterson + Sheridan, LLP

(57) ABSTRACT

An example method of provisioning a network service in a cloud computing system includes: defining, at an orchestrator, the network service to include a plurality of network functions; defining, at the orchestrator, network connectivity among the plurality of network functions; identifying a plurality of vendor device managers (VDMs) configured to provision virtual network functions that implement the plurality of network functions; and instructing, by the orchestrator, the VDMs to deploy the virtual network functions having the defined network connectivity.

11 Claims, 3 Drawing Sheets

SERVICE CHAINING OF VIRTUAL NETWORK FUNCTIONS IN A CLOUD COMPUTING SYSTEM

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "private data centers"). The public cloud can include a multi-tenant cloud architecture providing IaaS cloud services.

SUMMARY

One or more embodiments provide techniques for service chaining virtual network functions in a cloud computing system. In an embodiment, a method of provisioning a network service in a cloud computing system includes: defining, at an orchestrator, the network service to include a plurality of network functions; defining, at the orchestrator, network connectivity among the plurality of network functions; identifying a plurality of vendor device managers (VDMs) configured to provision virtual network functions that implement the plurality of network functions; and instructing, by the orchestrator, the VDMs to deploy the virtual network functions having the defined network connectivity.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
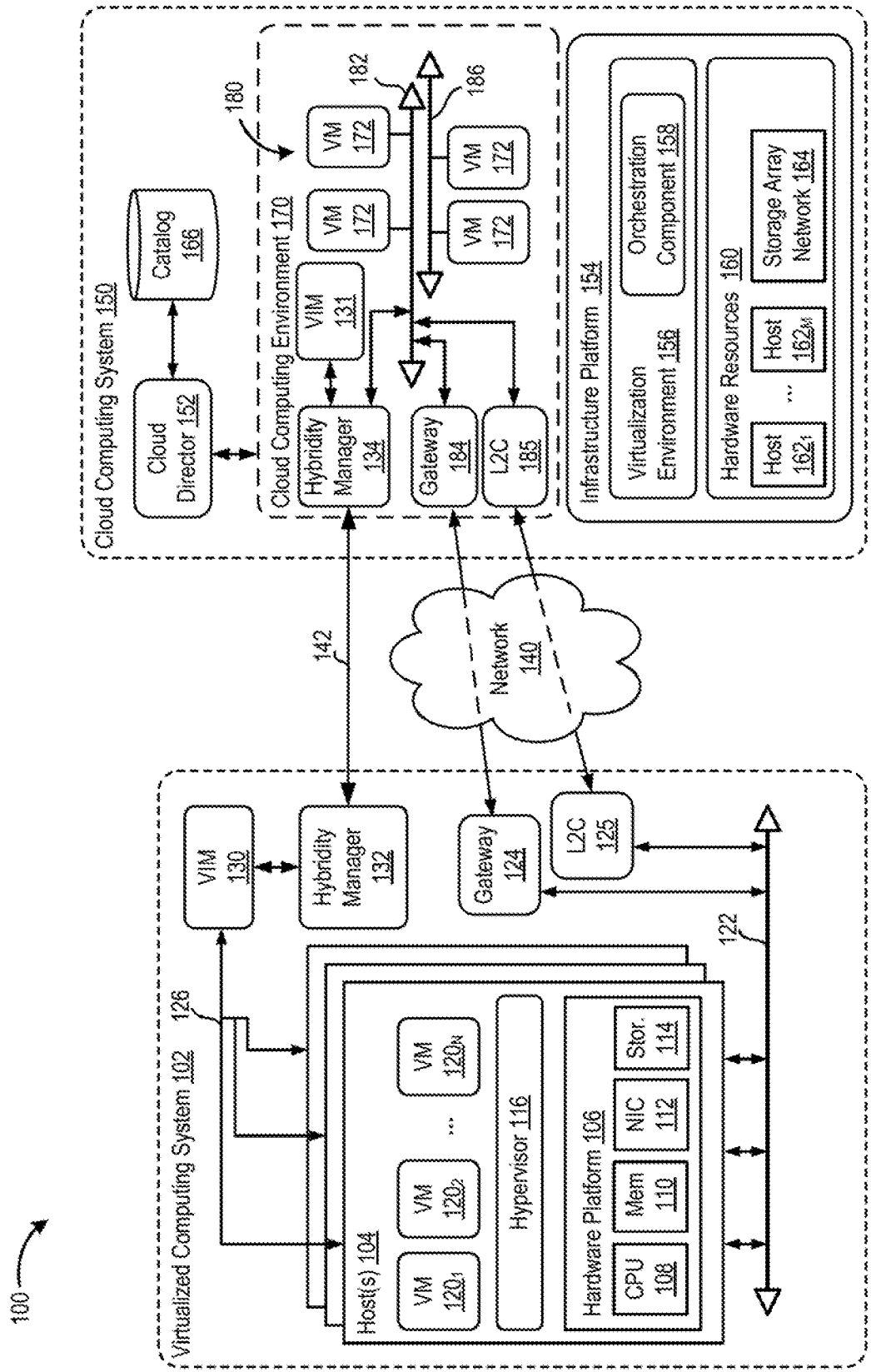
FIG. 1 is a block diagram of a hybrid cloud computing system, according to one embodiment disclosed herein.

FIG. 1 is a block diagram illustrating a hybrid cloud computing system 100 in which one or more embodiments of the present disclosure may be utilized. Hybrid cloud computing system 100 includes a virtualized computing system 102 and a cloud computing system 150. Hybrid cloud computing system 100 is configured to provide a common platform for managing and executing virtual workloads seamlessly between virtualized computing system 102 and cloud computing system 150. Although virtualized computing system 102 and cloud computing system 150 are shown for illustratively purposes, a hybrid cloud computing system may generally include any number of data centers.

In one embodiment, virtualized computing system 102 may be a data center controlled and administrated by a particular enterprise or business organization, while cloud computing system 150 may be operated by a cloud computing service provider and exposed as a service available to account holders, such as the particular enterprise in addition to other enterprises. In such a case, virtualized computing system 102 may be referred to as an on-premise data center(s), and cloud computing system 150 may be referred to as a "public" cloud service. In some embodiments, virtualized computing system 102 may be configured as a private cloud service providing cloud services to various organizations within the enterprise. In other embodiments, virtualized computing system 102 and cloud computing system 150 may both be public clouds.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In a hybrid cloud, a tenant may be provided with seamless access to one or more private cloud resources and/or public cloud resources.

Virtualized computing system 102 includes one or more host computer systems 104. Each of hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processors 108 are configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as networks 122 and 126 within virtualized computing system 102. Network interface 112 may include one or more network adapters, also referred to as network interface cards (NICs). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualized infrastructure manager (VIM) 130) that may communicate with the plurality of hosts 104 via network 126, sometimes referred to as a management network. In one embodiment, VIM 130 is a computer program that resides and executes in a central server, which may reside in virtualized computing system 102, or alternatively, VIM 130 may run as a VM in one of hosts 104. One example of a VIM is the vCenter Server® product made available from VMware, Inc. VIM 130 is configured to carry out administrative tasks for virtualized computing system 102, including managing hosts 104, managing VMs 120 running within each host 104, provisioning VMs, migrating VMs from one host to another host, and load balancing between hosts 104.

As shown, virtualized computing system 102 further includes a hybridity manager 132 that is in communication with VIM 130 and configured to manage and integrate virtualized computing resources provided by cloud computing system 150 with virtualized computing resources of computing system 102 to form a unified "hybrid" computing platform. In one embodiment, hybridity manager 132 is configured to deploy VMs in cloud computing system 150, transfer VMs from virtualized computing system 102 to cloud computing system 150, and perform other "cross-cloud" administrative tasks, as described in greater detail later. Although shown as a separate computer program, which may execute in a central server or run in a VM in one of hosts 104, hybridity manager 132 may alternatively be a module or plug-in complement to VIM 130.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to and communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 150. The stretched network may be separate from the network used by gateways 124 and 184 so that, e.g., VM migration traffic over network used by gateways 124 and 183 does not create latency in stretched network.

As shown, cloud computing system 150 includes a hybridity manager 134 configured to communicate with the corresponding hybridity manager 132 in virtualized computing system 102 to enable a common virtualized computing platform between virtualized computing system 102 and cloud computing system 150. Hybridity manager 134 (e.g., executing as a virtual machine) may communicate with hybridity manager 132 using Internet-based traffic via a VPN tunnel established between gateways 124 and 184, or alternatively, using direct connect 142. In addition, hybridity manager 134 is in communication with a VIM 131, which may perform similar functionalities as VIM 130, described above.

Service Chaining of Virtual Network Functions

Figure 2:
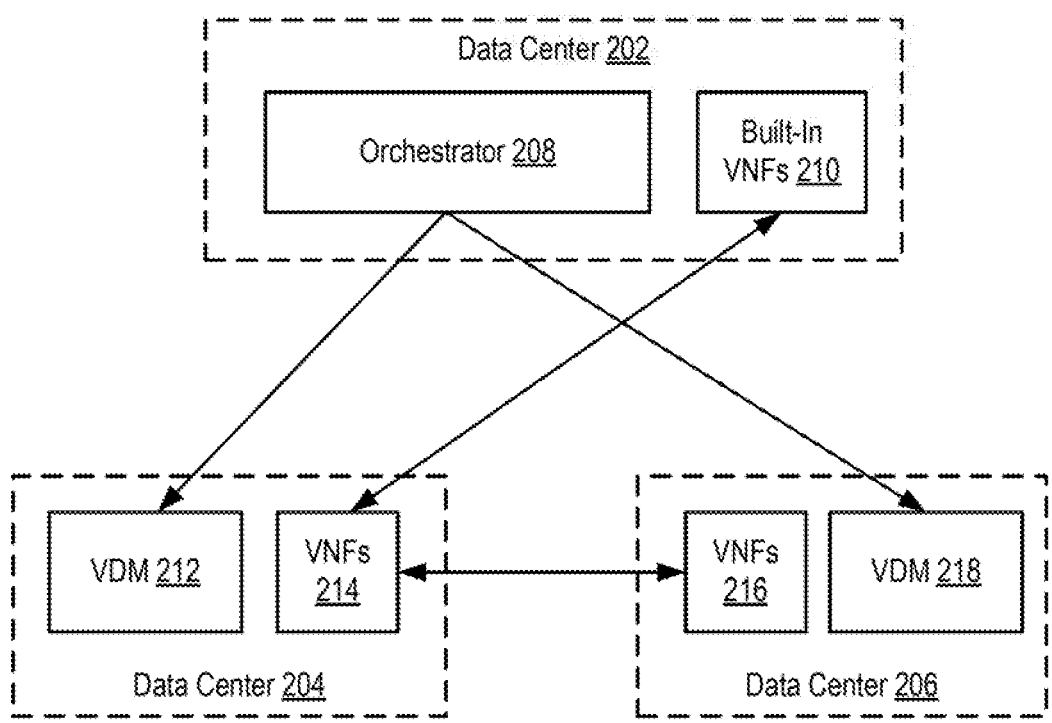
FIG. 2 is a block diagram depicting a computing system according to an embodiment.
Figure 3:
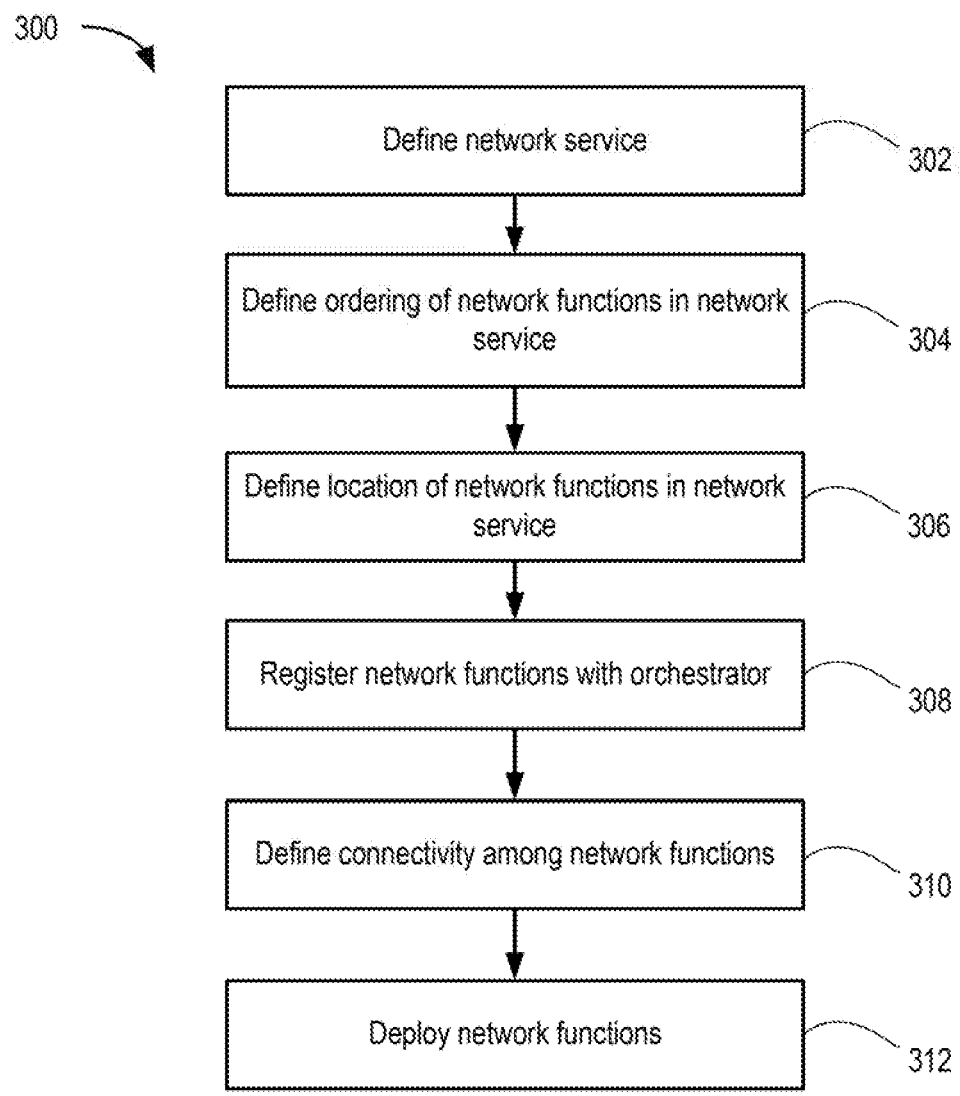
FIG. 3 is a flow diagram depicting a method of provisioning a network service in the computing system of FIG. 2 according to an embodiment.

FIG. 2 is a block diagram depicting a computing system 200 according to an embodiment. FIG. 3 is a flow diagram depicting a method 300 of provisioning a network service in the computing system 200 according to an embodiment. Computing system 200 includes a plurality of data centers, e.g., data centers 202, 204, and 206. Each data center 202, 204, and 206 can be implemented using the hybrid cloud system 100 shown in FIG. 1 or using a similar public or private cloud system. Data center 202 implements an orchestrator 208, with which an administrator can interact to provision a network service. Data centers 204 and 206 include vendor device managers (VDMs) 212 and 218, respectively. Orchestrator 208 communicates with VDMs 212 and 218 to provision virtual network functions (VNFs) 214 and 216, respectively. A particular network service comprises a plurality of network functions, which are implemented using VNFs 214 and 218. In some embodiments, data center 202 can also include built-in VNFs 210, which can be used to implement one or more network functions of a particular network service.

Method 300 begins at step 302, where an administrator defines a network service. A network service includes a plurality of network functions. Example network functions include control plane functions, back-office functions (e.g., billing functions), packet processing functions, and the like. The network functions can be provided by different vendors and may be disposed in different locations.

At step 304, the administrator defines an ordering of the network functions in the network service. For example, the network functions of the network service may require deployment in a particular order, a particular bootstrap order, or the like. At step 306, the administrator defines a placement for each network function of the network service. For example, some network functions can be placed in data center 204, while other network functions can be placed in data center 206. In some embodiments, some network functions can be placed in data center 202. For example, data center 204 can be an edge computing system configured to support implementation of edge-based network functions, whereas data center 206 can be a core computing system configured to support implementation of core network functions.

At step 308, the orchestrator registers the network functions of the network service with VDMs 212 and 218 in data centers 204 and 206 based on the defined network service. The network functions are implemented using VNFs 214 and 218. The chaining of network functions (either local to a given data center or across data centers) is abstracted from the VNF itself. For example, inside a single data center, VNFs can be chained using local connections. However, when traversing data center boundaries, such as VNF 214 and VNF 216, connections traverse a logical network (e.g., L2 network, L3 network, etc.). For example, the logical network can be the hybridity overlay network that transmits over network 140 (FIG. 1).

Each VDM 212 and 218 is configured to deploy respective VNFs 214 and 218 and performs life-cycle management thereof. Orchestrator 208 registers hooks with VDMs 212 for accessing VNFs 214 and 218. Notably, service chaining of network functions through orchestrator 208 is agnostic of LAN or WAN network connections.

At step 310, orchestrator 208 defines connectivity among the network functions specified in the network service. For example, some network functions may require Layer-2 or Layer-3 connectivity, optical connectivity, or the like. In the example of FIG. 2, some VNFs 214 require connectivity with VNFs 216. In addition, some VNFs 214 require connectivity with built-in VNFs 210 in data center 202. At step 312, orchestrator 208 instructs VDMs 212 and 218 to deploy VNFs 214 and 218 to implement the network functions having the specified connectivity. Orchestrator 208 can also deploy and connect any built-in VNFs 210 as requested for the network service. The VNFs 214, 216 and optionally 210 implement the network functions of the requested network service.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of provisioning a network service in a cloud computing system, comprising:
    defining, at an orchestrator, the network service to include a plurality of network functions;
    defining an order of the plurality of network functions of the network service;
    defining, at the orchestrator, network connectivity among the plurality of network functions, wherein the network connectivity of the plurality of network functions is based on the order defined for the plurality of network functions of the network service, and wherein the connectivity includes layer-2 or layer-3 network connectivity between network functions;
    defining a location of each network function of the network service;
    identifying a plurality of vendor device managers (VDMs) configured to provision virtual network functions that implement the plurality of network functions, wherein the VDMs are identified based on the location of each network function of the network service; and
    instructing, by the orchestrator, the VDMs to deploy the virtual network functions in the defined order of the plurality of network functions.

2. The method of claim 1, wherein the orchestrator is configured to deploy a plurality of built-in virtual network functions, and wherein the method further comprises:
    identifying at least one built-in virtual network function for implementing a respective at least one network function of the network service; and identifying, at the orchestrator, additional network connectivity between the virtual network functions and the built-in virtual network functions.

3. The method of claim 2, further comprising:
deploying, by the orchestrator, the at least one built-in virtual network function having the additional network connectivity.

4. The method of claim 1, wherein the orchestrator is implemented in a first data center and each of the plurality of VDMs is implemented in an additional data center.

5. A non-transitory computer readable medium comprising instructions, which when executed in a computer system, causes the computer system to carry out a method of provisioning a network service in a cloud computing system, comprising:
defining, at an orchestrator, the network service to include a plurality of network functions;
defining an order of the plurality of network functions of the network service;
defining, at the orchestrator, network connectivity among the plurality of network functions, wherein the network connectivity of the plurality of network functions is based on the order defined for the plurality of network functions of the network service, and wherein the connectivity includes layer-2 or layer-3 network connectivity between network functions;
defining a location of each network function of the network service;
identifying a plurality of vendor device managers (VDMs) configured to provision virtual network functions that implement the plurality of network functions, wherein the VDMs are identified based on the location of each network function of the network service; and
instructing, by the orchestrator, the VDMs to deploy the virtual network functions in the defined order of the plurality of network functions.

6. The non-transitory computer readable medium of claim 5, wherein the orchestrator is configured to deploy a plurality of built-in virtual network functions, and wherein the method further comprises:
identifying at least one built-in virtual network function for implementing a respective at least one network function of the network service; and
identifying, at the orchestrator, additional network connectivity between the virtual network functions and the built-in virtual network functions.

7. The non-transitory computer readable medium of claim 6, further comprising:
deploying, by the orchestrator, the at least one built-in virtual network function having the additional network connectivity.

8. The non-transitory computer readable medium of claim 5, wherein the orchestrator is implemented in a first data center and each of the plurality of VDMs is implemented in an additional data center.

9. A computing system, comprising:
a memory storing program code; and
a processor, coupled to the memory, configured to execute the program code to provision a network service in a cloud computing system by:
defining, at an orchestrator, the network service to include a plurality of network functions;
defining an order of the plurality of network functions of the network service;
defining, at the orchestrator, network connectivity among the plurality of network functions, wherein the network connectivity of the plurality of network functions is based on the order defined for the plurality of network functions of the network service, and wherein the connectivity includes layer-2 or layer-3 network connectivity between network functions;
defining a location of each network function of the network service;
identifying a plurality of vendor device managers (VDMs) configured to provision virtual network functions that implement the plurality of network functions, wherein the VDMs are identified based on the location of each network function of the network service; and
instructing, by the orchestrator, the VDMs to deploy the virtual network functions in the defined order of the plurality of network functions.

10. The computing system of claim 9, wherein the orchestrator is configured to deploy a plurality of built-in virtual network functions, and wherein the processor is further configured to:
identify at least one built-in virtual network function for implementing a respective at least one network function of the network service; and
identify, at the orchestrator, additional network connectivity between the virtual network functions and the built-in virtual network functions.

11. The computing system of claim 10, wherein the processor is further configured to:
deploy, by the orchestrator, the at least one built-in virtual network function having the additional network connectivity.

* * * * *